Sept. 30, 1941.     J. B. HAYDEN     2,257,236
PISTON
Filed July 29, 1939
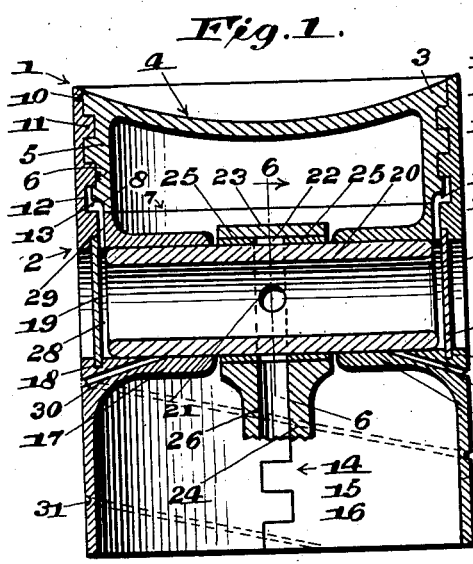
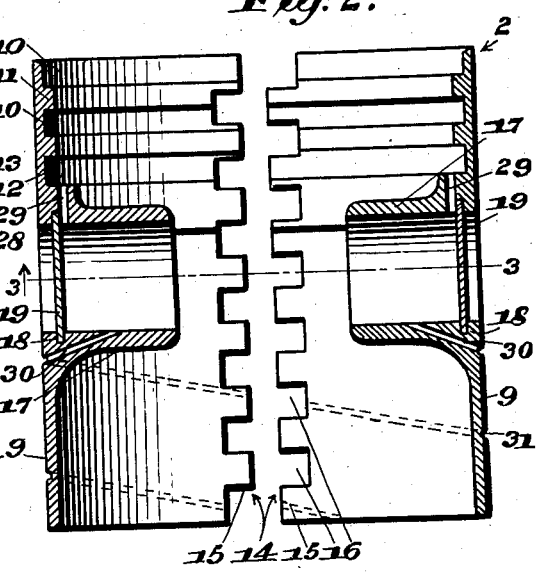
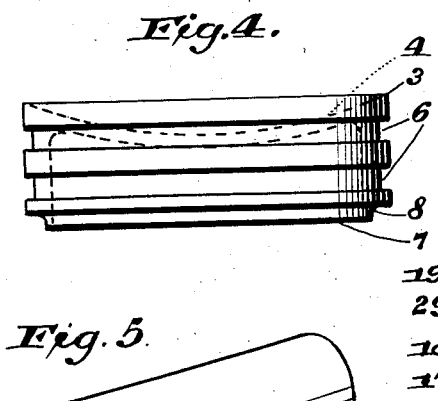
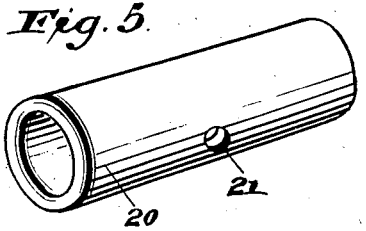
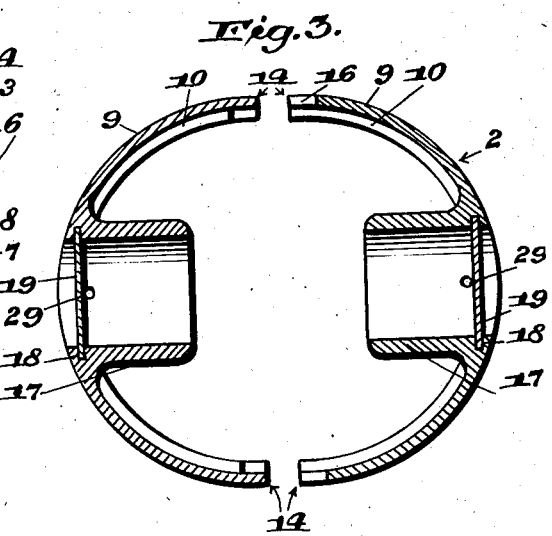
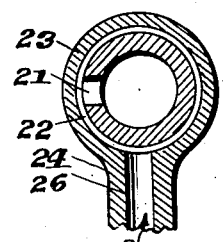
FOR OIL UNDER PRESSURE
Inventor
Joseph B. Hayden.
By Munn, Anderson & Liddy
Attorneys Patented Sept. 30, 1941

2,257,236

UNITED STATES PATENT OFFICE 2,257,236

PISTON

Joseph Bennett Hayden, Greensburg, Pa.

Application July 29, 1939, Serial No. 287,397

7 Claims. (Cl. 309—12)

This invention relates to improvements in pistons, and although the principle thereof is such as makes the piston adaptable to a variety of machines, yet it is especially adapted to use in an internal combustion engine. As is commonly known, an engine of this character is based fundamentally upon a cylinder which has an affixed closure at one end and a movable piston which constitutes the closure for the other end.

The power is derived by translating the motions of the piston which respond to internal explosions, and because of the fact that the amount of power is in a large measure due to tightly sealing the combustible mixture within the cylinder, it is absolutely necessary to provide the piston with flexible rings which make tight contact with the cylinder wall for the establishment and maintenance of the sealing function.

The instant invention has been devised as an improved step toward the attainment of the latter function, and in distinction from the way in which current piston rings act said piston serves to maintain as an effective a seal when the cylinder is hot and expanded as it does when the cylinder is cool and contracted.

Another phase of the invention concerns the assemblage of the piston in the cylinder. It is well known that this operation requires considerable mechanical skill as well as special tools to be used in compressing the rings preparatory to driving the piston into the cylinder. The fitting of wrist pins is also an accurate machine job. The necessities arising out of fitting a cylinder with a piston according to present practice are lessened considerably by the use of the improved piston in a manner which is presently disclosed. With this preamble in mind the objects of the invention are as follows:

First, to provide a piston adaptable to use in virtually any kind of a machine requiring a piston, but which is particularly adaptable to an internal combustion engine.

Second, to provide a piston wherein hydraulic pressure is maintained to hold the guide sections out against the wall of the cylinder in which the piston works, said sections having a perfect bearing at all times against said wall regardless of variations in the size of the cylinder due to changes in temperature.

Third, to provide a piston, the expansion of which against the wall of the cylinder is maintained by internal oil pressure set up while the engine is in operation.

Fourth, to provide a piston composed of inherently loose parts but which automatically and positively locks itself and its full-floating piston pin in their relative positions to the connecting rod simply by their insertion into the cylinder.

Other objects and advantages will appear in the following specification, reference being had to the accompanying drawing, in which:

Figure 1 is a vertical cross section of a complete piston and rod assemblage.

Figure 2 is a vertical cross section particularly illustrating the two guide sections slightly separated.

Figure 3 is a cross section taken on the line 3—3 of Fig. 2.

Figure 4 is a side elevation of the piston head alone.

Figure 5 is a perspective view of the hollow wrist pin.

Figure 6 is a detail vertical section taken on the line 6—6 of Fig. 1.

In carrying out the invention the piston generally designated 1 comprises a tubular body 2 which is separable from the head 3. The piston head is a rigid metallic structure, much on the order of an ordinary piston head, excepting that it is much shorter in the axial direction.

Said head has a concavity at 4, and it includes a skirt 5 which has several fairly deep external grooves 6 (Fig. 4). The outer edge of the bottom end 7 of the piston head 3 is annularly fluted at 8 to form an entrance to an internal recess or oil reservoir 13. At this point it is desired to state that the piston head 3 does not in all instances need to be as short in the axial direction as depicted in the drawing.

Instead of confining the grooves 6 to the narrow skirt expanse shown, said skirt can be made longer in the axial direction and be provided with similar grooves 6 at an exposed place above the top of the tubular body 2 for the purpose of carrying one or two oil-seal rings. However, this variation is purposely not shown in order to avoid possible confusion with and detraction from the specific character of the tubular body and of the primary use of the grooves 6 as part of a coupling means by which the rest of the piston is loosely held.

The tubular body 2 comprises a plurality of guide sections 9 (Figs. 2 and 3). These guide sections closely suggest the skirt portion of the ordinary piston, but unlike the former said sections comprise two or more parts, and in the event of their comprising two parts the latter, obviously, consist of halves. The two guide sections are nearly identical. They are internally grooved at 10 (Fig. 2) but these grooves are so stepped that the ribs 11 which they form will fit the previously mentioned grooves 6 in the head 3.

In other words, the interengaging grooves and ribs produce a loose coupling. The looseness is not of such a degree as to permit rattling of the guide sections upon the head 3. To the contrary the fit is fairly tight but not tight enough to prevent radial sliding of the guide sections 9 in respect to the head 3 when an internal fluid pressure is built up to cause said sliding.

To this end the bottom one of the grooves in the guide sections, said groove being designated 12 for the purpose of distinction, coincides with the flute 8 to define an internal recess 13 (Fig. 1). This recess constitutes an oil channel. Oil is ordinarily the expanding medium, although it is conceivable that other fluids under pressure might serve the same purpose.

The confronting edges 14 of the guide sections 9 have a plurality of tenons 15 which are so spaced in reference to each other as to match the mortices 16. The resulting male and female joint which is provided here is also slidable, as in the instance of the grooves and ribs between the piston head 3 and the guide sections 9. When these parts slide as previously pointed out, there is also a relative sliding between the mortices and tenons, and the latter are of sufficient depth, that a disengagement will never occur.

Each of the guide sections 9 has an integral wrist pin boss 17. These bosses are necessarily in axial alinement. There are grooves at 18 near the outer ends of the wrist pin bores which contain the rims of expansion plugs 19. These plugs comprise the diversely movable heads of an oil reservoir and expansion chamber of which the hollow wrist pin 20 is the main central part.

The wrist pin 20 is fitted at its ends in the bores of the bosses 17. Since these bosses are integral with the guide sections 9, and since the plugs 19 are fixedly attached to said guide sections, it follows that the outward displacement of the plugs by virtue of oil pressure inside of the expansion chamber means a corresponding displacement of the guide sections into tight engagement with the cylinder wall. The wrist pin in reference to which this displacement occurs, both outwardly as described and also inwardly when there is a decrease in size of the cylinder, has a radial hole 21 which provides communication between the interior of the hollow wrist pin and a channel 22 on the inside of the bearing head 23 of the connecting rod 24. The bearing head is bushed at 25. The bushing comprises two rings which are spaced apart to define the channel 22.

It is with this channel that a bore 26 in the connecting rod 24 has communication. This bore extends longitudinally of the connecting rod and has access to the oiling system of the engine. For this purpose it ends at the bottom (not shown) in a crank pin bearing which is customarily supplied with oil by an oil pump. The bore 26 is perhaps a little larger than similar bores in ordinary use because it is regarded desirable to provide for the circulation of a sufficiently large volume of oil to adequately expand the guide sections 9.

The hollow wrist pin 20 stops short of the closure plugs 19, thereby defining end spaces 28 (Fig. 1). These spaces, and consequently the interior of the wrist pin 20, have communication with the recess 13 through holes 29 drilled into the wrist pin bosses. The latter also have very small holes 30, affording communication between the wrist pin bores and the external surfaces of the sections 9, to allow enough oil to pass out for the lubrication of the piston and cylinder wall.

This purpose is facilitated by making the holes 30 communicate with a helical groove 31 in the surface of the combined sections 9. In order to meet this groove the holes 30 are drilled on a pitch. Some oil will pass the ends of the hollow wrist pin under internal pressure into the bores of the bosses 17 and thus enter the holes 30 whence it flows by gravity for the purpose stated.

The operation is readily understood. As soon as the engine starts up there will be a pressure of oil inside of the hollow wrist pin 20, the oil being supplied by way of the connecting rod bore 26. This oil under pressure acts at once against the expansion plugs 19, tending to push the guide section piston halves 9 apart. They will be separated as far as possible and since they are free to slide on the wrist pin they will yield to the displacing effort of the pressure oil until they make tight but sliding contact with the wall of the cylinder.

The wrist pin 20 acts as a double but stationary piston with a movable cylinder on each end. This structure collectively comprises an expansion chamber. The so-called cylinders consist of the wrist pin bosses 17 and the adjacent parts of the guide sections. Said guide sections are thus forced out against the cylinder walls and held there as long as pressure is maintained in the oil pressure system. Thus the tubular body of the piston is subject to inflation and deflation, in a manner of speaking, automatically expanding and contracting in response to variations in the sizes of the piston and cylinder. The oil channel 13 is intended to contain oil under pressure to eliminate any possibility of rattling of the guide sections 9.

A matter of no little importance concerns the assemblage of the piston 1 and its connecting rod 24. The wrist pin 20 will be centered in the bearing head 23, whereupon the two sections 9 will be fitted upon the protruding ends of the wrist pin. The head 3 is held in place while the guide sections are slid together. The various ribs and grooves in the head and piston body will interengage as will also the mortices and tenons along the confronting edges 14.

The assemblage is now introduced into the engine cylinder, and when it is, then the various parts mentioned are automatically and positively locked together in their proper relative working positions. No other type of securement is needed, it being the cylinder in which the piston is operable that acts as the binding medium for keeping the piston and connecting rod assemblage intact. This piston can be manufactured by drop forging and assembled without any welding.

Reverting to the starting of the engine, it is readily understood that as the oil is discharged into the hollow wrist pin 20 under increasing pressure as the speed of the engine increases, it will back up in the end spaces 28 with a corresponding pressure and be driven back to the holes 30 with considerable force. From here there will be a constant feed of oil through the holes 30 into the helical groove 31 as long as pressure is maintained in the oiling system.

I claim:

1. In combination, a piston comprising a sectional body adapted to operate in the cylinder of an engine having an oiling system, means embodied in the piston constituting an expansion chamber of which portions of the sections are a part, and means to conduct oil from said system under pressure induced by the operation of the engine to said chamber to displace said portions and force the sections against the cylinder wall during said operation.

2. A piston operable in the cylinder of an engine which produces hydraulic pressure in a lubricating oil stream when in operation, said piston consisting of a hollow wrist pin with a hole for the admission of the oil and a piston body composed of sections mounted upon the ends of the wrist pin, said sections embodying means by which to entrap said oil received from the hole inside of the piston to act expansively upon the sections thereby to displace them outwardly against the cylinder wall, at least one of said sections in turn having a hole for the escape of the oil from said entrapment.

3. A piston comprising a rigid head, a pair of sections having wrist pin bosses for slidable movement upon the ends of a hollow open-ended wrist pin, said sections including means providing closures at the ends of the wrist pin, said wrist pin, closure means and portions of the bosses defining an oil pressure expansion chamber, a connecting rod swung from the wrist pin and having a bore in communication with the interior of said chamber to supply oil under pressure to said chamber, and means loosely coupling said sections to the head and in slidable relationship thereto for displacement in the axial direction of the wrist pin under pressure of said oil.

4. A piston comprising a head, a plurality of sections depending from the head and defining a tubular body, said head and sections respectively having an annular flute and recess in confronting relationship to define an oil chamber, the exterior of the sections having a helical oil groove, a hollow, open-ended wrist pin embodied in the piston, slidably supporting the sections and being in communication with said oil channel, and a connecting depending from the wrist pin, having a bore for conducting oil and being in communication with the inside of the wrist pin to displace the sections and supply oil to the channel, said sections having holes receiving oil from the wrist pin for a feed to the helical groove.

5. In a piston construction, a head having a skirt portion in communication with a pressure oil system, at least one circumferential groove on said skirt portion, a sectional structure slidably interengaged with said circumferential groove and depending from said skirt portion, and a flute on one of the edges of the end of the skirt portion forming part of an oil channel with the confronting sectional structure, whereby pressure oil will press said structure outwardly.

6. In combination, a connecting rod having a bore for communication at one end with a pressure oiling system of an engine, a hollow, open-ended wrist pin from which the connecting rod is suspended and having a hole in constant communication with said bore for access of the oil under pressure to the inside of the wrist pin, piston skirt sections riding upon the wrist pin at the sides of the connecting rod and having closures to confront the open ends for the impingement of the oil under pressure, and a head completing a piston with said sections, said head carrying the sections in radially slidable relationship for relative spreading into cylinder wall contact by said oil pressure.

7. A piston comprising an externally circumferentially grooved head, a pair of internally circumferentially ribbed sections in groove-and-rib connection with said head, a hollow open-ended wrist pin on the substantial extremities of which said sections are laterally slidable, said wrist pin having a hole for the admission of pressure fluid, and closure means for the ends of the wrist pin, being embodied in said sections to respond to the impact of the pressure fluid for a separating movement of the sections.

JOSEPH BENNETT HAYDEN.